United States Patent [19]

Ritter et al.

[11] Patent Number: 4,606,906
[45] Date of Patent: Aug. 19, 1986

[54] PROCESS OF SYNTHESIZING MIXED BAO-TIO$_2$ BASED POWDERS FOR CERAMIC APPLICATIONS

[75] Inventors: Joseph J. Ritter, Mt. Airy; Robert S. Roth, Silver Spring; Taki Negas, Frederick, all of Md.

[73] Assignee: The United States of America as represented by the Secretary of Commerce, Washington, D.C.

[21] Appl. No.: 671,539

[22] Filed: Nov. 15, 1984

[51] Int. Cl.$^4$ .................. C01G 23/04; C04B 35/46
[52] U.S. Cl. .................. 423/598; 501/12; 501/136; 501/137
[58] Field of Search ......... 501/137, 12, 138, 136; 423/598

[56] References Cited

U.S. PATENT DOCUMENTS

| | | | |
|---|---|---|---|
| 3,413,083 | 11/1968 | Daendliker | 423/598 |
| 3,647,364 | 3/1972 | Mazdiyasni et al. | 423/598 |
| 3,847,583 | 11/1974 | Dislich | 501/12 |
| 3,938,064 | 2/1976 | O'Bryan, Jr. et al. | 423/598 |
| 4,058,592 | 11/1977 | Quets | 501/137 |
| 4,061,583 | 12/1977 | Murata et al. | 252/520 |
| 4,086,649 | 4/1978 | Hanold | 501/137 |

OTHER PUBLICATIONS

Barium Oxide-Titanium Dioxide System in the Region of Barium Polytitanates; Schwarzbach et al, (Res. Inst. Electrotech) Silikaty 1968, 12(3), 231–9.
Coprecipitated Barium and Titanium Compounds and Formation of Barium Titanates from Them, Livar et al, Izu. Akad. Nauk. SSSR Neorg Mater 1976, 12(b), 1134–6 (Russ).
Preparation of Compounds in Barium (II) Oxide Titanium (IV) Oxide System by Coprecipitation from Alkoxides, Suwa et al, Funlai Oyobi, 1978, 25(5) 164–7 (Japan).

Primary Examiner—William R. Dixon, Jr.
Assistant Examiner—Karl Group
Attorney, Agent, or Firm—Eugene J. Pawlikowski; Alvin J. Englert; James A. Oliff

[57] ABSTRACT

A process for producing any desired Ba/Ti mixture to be formulated as an amorphous solid which crystallizes at very low temperatures to yield a desired phase or phases is disclosed. The process yields products free of undesirable impurities and allows macroscopic production of certain phases in the baria-titania system, having exceptional high frequency dielectric properties, that were previously unattainable through solid-state high temperature production techniques.

18 Claims, No Drawings

PROCESS OF SYNTHESIZING MIXED BAO-TIO₂ BASED POWDERS FOR CERAMIC APPLICATIONS

BACKGROUND OF THE INVENTION

1. Field of the Invention

The present invention relates to electronic ceramic compounds in the $BaO$-$TiO_2$ system. Different phases in the $BaO$-$TiO_2$ system are of strategic and industrial importance for transducer and microwave dielectric applications. The barium titanate ($BaTiO_3$) phase exhibits ferroelectric behavior, i.e., a spontaneous alignment of electric dipoles within the material which is analogous to the alignment of magnetic dipoles in ferromagnetic materials. The $BaTiO_3$ phase has been used as a transducer material and as a basis for very high dielectric constant ceramics in ultrasonic devices, microphones, phonograph pickups, accelerometers, strain gauges and sonar devices. The $BaTi_4O_9$ phase is used as a microwave dielectric since it has a relatively high dielectric constant and high Q (low dielectric loss) combined with a very low temperature dependence of the dielectric constant (TCK). Recent investigations have shown that the $Ba_2Ti_9O_{20}$ phase exhibits even more desirable properties for microwave dielectrics, but reproducible ceramic processing parameters have so far been very difficult to formulate. Also, these investigations have indicated that phases with higher $BaO$:$TiO_2$ ratios than 2:9 would exhibit very useful high frequency dielectric properties.

2. Description of the Prior Art

In U.S. Pat. No. 4,058,592, a process for the preparation of sub-micron barium-titanate powders is disclosed. The process involves mixing a carbohydrate material with a solution of barium and titanium compounds, at least one of which contains a chloride ion, followed by ignition and calcination of the mixture. In this process, the presence of chloride ions during ignition precludes the direct formation of barium titanate and thus the chloride ions must be removed prior to ignition.

In U.S. Pat. No. 4,061,583, a process for the preparation of barium titanate is disclosed. The process involves adding an aqueous solution containing titanium and barium ions to an aqueous alkaline solution containing hydrogen peroxide, recovering a precipitated complex peroxide corresponding to barium titanate from the resulting mixture, and decomposing the precipitate by heating. Amorphous substantially stoichiometric barium titanate is thereby obtained.

In U.S. Pat. No. 4,086,649, several processes for the preparation of stoichiometric barium titanate are disclosed. A first process involves mixing an alcoholic solution of tetraisopropyl titanate and corn syrup with an aqueous solution of barium acetate, followed by drying and igniting the resultant mixture to form barium titanate powders. A second process involves mixing an aqueous solution of barium acetate and corn syrup with an alcoholic solution of triethanolamine titanate, followed by drying and igniting the resultant mixture to form barium titanate powders. A third process involves mixing an aqueous solution of barium acetate and sucrose with an alcoholic solution of triethanolamine titanate, followed by drying and igniting the resultant mixture to form barium titanate powders.

A first conventional solid-state technique for the preparation of barium-titanate powders involves mixing $TiO_2$ powder with $BaCO_3$ powder and calcining the resultant mixture at 800°–1100° C. The calcined mixture is then pulverized into a fine powder by conventional mortar and pestle, ball-milling or jet-milling techniques. This fine powder is pressed into a desired shape and fired at 1300°–1450° C. This process yields a powder of relatively low-purity that is used to process dielectric ceramics for applications requiring less demanding performance.

A second conventional solid-state technique for the preparation of barium-titanate powders involves precipitating a BaTi-oxalate precursor from oxalic acid and metal chlorides. This precursor is then calcined at elevated temperature to crystallize $BaTiO_3$. These powders are of higher purity than the powders of the first conventional technique but chloride contamination is difficult to eliminate completely.

SUMMARY OF THE INVENTION

The present invention is directed to a method for the preparation of mixed baria-titania powders that avoid the above-mentioned disadvantages which are characteristic of the prior art. More specifically, the present invention is directed to an alcohol precursor precipitation method that allows any desired Ba/Ti mixture to be formulated as an amorphous solid which crystallizes at very low temperatures to a desired phase or phases. Also, the method avoids comtamination by chloride ions and milling media and yields a product essentially free of undesirable impurities. Finally, and most importantly, the method yields crystalline barium titanates which cannot be synthesized in macroscopic quantities by any other known means.

DETAILED DESCRIPTION OF THE INVENTION

The present invention relates to a method for the preparation of crystalline, single-phase baria-titania powders.

The process involves first preparing a baria-titania precursor and then calcining the precursor to form crystalline, single-phase baria-titania powders.

The precursor synthesis involves a procedure having four distinct phases. The solution produced at any of the first, second or fourth stages can be subjected to hydrolysis to form the final precursor product.

The first stage involves preparing a method barium-titanium alkoxide solution under a dry atmosphere, preferably dry, $CO_2$-free argon. To prepare this solution, barium oxide is first dissolved in a lower alkyl alcohol, for instance $C_{1-3}$ alkyl alcohols, preferably ethanol, to form a barium alkoxide solution. The barium alkoxide solution is then filtered if necessary to remove undissolved solids and the concentration of barium in the solution is determined. Next, a titanium alkoxide, for instance titanium isopropoxide, is dissolved in a lower alkyl alcohol, for instance $C_{1-3}$ alkyl alcohol, preferably ethanol, to form a titanium alkoxide solution. The titanium alkoxide solution is prepared so that the concentration of barium in the barium alkoxide solution and the concentration of titanium in the titanium alkoxide solution have a molar ratio corresponding to the Ba/Ti ratio of the desired final product. Preferably, the titanium alkoxide solution is prepared so that the concentration of barium in the barium alkoxide solution will bear a 2:9 or 1:5 molar ratio to the concentration of titanium in the titanium alkoxide solution depending on whether the $Ba_2Ti_9O_{20}$ phase or the $BaTi_5O_{11}$ phase, respectively, is desired as a final product. Then the barium alkoxide solution and the titanium alkoxide solution are combined to form the mixed barium-titanium alkoxide solution.

The second stage involves stirring the mixed barium-titanium alkoxide solution produced according to the first stage to form a precipitate. This stage of the precursor synthesis is preferably carried out at room temperature. The precipitate generally appears after about 45 minutes.

The third stage involves dissolving the precipitate formed during the second phase. This stage of the precursor synthesis is carried out by heating the precipitated mixed barium-titanium alkoxide solution to about 55° C. to produce a clear solution. The transition of the solution from the second stage to the third stage is reversible, i.e., by cooling the solution produced in the third stage back to room temperature, the precipitated mixed barium-titanium alkoxide material of the second stage is again produced.

The fourth stage involves further heating the clear mixed barium-titanium alkoxide solution produced according to the third stage to form an irreversibly precipitated mixed barium-titanium system. This stage of the precursor synthesis is carried out by heating the clear mixed barium-titanium alkoxide solution to the reflux temperature of the mixture. Preferably, the mixture is heated to about 80° C. The mixture is then refluxed for about 15 to 20 hours, preferably 18 hours, and the final irreversible precipitate eventually develops.

As mentioned above, the mixed barium-titanium system can be subjected to hydrolysis to hydrolyze all alkoxide groups in the system at any of the first, second or fourth stages. Hydrolysis of the solution is preferably carried out by adding either an ethanol-water solution or an ethanol-water/ammonium hydroxide solution to the mixed barium-titanium system. The ethanol-water solution or the ethanol-water/ammonium hydroxide solution preferably contains water in a 10–20% excess over that required to hydrolyze all alkoxy groups in the mixed barium-titanium solution. When hydrolysis is performed with a first stage solution, a hydrolyzed precipitate develops in the mixed barium-titanium solution. When hydrolysis is performed at the second or fourth stage, the preexisting precipitate as well as the solution are hydrolyzed. The hydrolyzed precipitate resulting from a first, second or fourth stage is then separated from the solution and dried to yield a baria-titania precursor.

All precursor syntheses are preferably carried out in the presence of a dry, inert gas which is free from carbon dioxide, such as argon, xenon, dry nitrogen or helium gas, to avoid adverse effects such as reaction of barium ions with carbon dioxide to form barium carbonate or premature hydrolysis. Also, all precursor syntheses are preferably carried out in inert containers such as glass or teflon containers.

The dried baria-titania precursor is next calcined to form crystalline, single-phase baria titania powders. The precursor is calcined at a temperature of from 700° C. to 1200° C. for about 15 to 20 hours and is preferably calcined to about 1100° C. for about 18 hours.

After calcination, the calcined precursors are characterized by x-ray diffraction techniques to determine the phase equilibria distribution of the system.

Except for compositions in proximity to the 1:1 ratio, the dried baria-titania precursors were all found to be amorphous by x-ray diffraction, as were samples heated for about 16 hours at 500° C. Samples of each precursor were calcined at 700° C., 800° C., 1000° C., 1100° C., 1200° C., and other temperatures to clarify the phase equilibria distribution in each system. All were found to be crystalline, single phase, solid solutions at 700° C. or mixtures of a single crystalline and an amorphous phase, depending on the original composition and the nearest "stable" phase. The compounds $Ba_6Ti_{17}O_{40}$ and $Ba_2Ti_9O_{20}$ did not form at low temperatures but appeared at about 1100° C. The phases $Ba_4Ti_{13}O_{30}$ and $BaTi_4O_9$ occurred at all temperatures above about 800° C. up to their respective melting points.

The phase $BaTi_2O_5$ were found for the first time to occur at low temperature (700° C.) and appears to be stable or at least metastable for indefinite time periods up to temperatures of about 1100° C. At higher temperatures, it was found to form first from amorphous precipitates of appropriate compositions and very gradually to transform to $BaTiO_3$ and $Ba_6Ti_{17}O_{40}$.

The compound $BaTi_5O_{11}$ which has previously been found only in tiny crystallites which metastably formed from quenched liquids or as a second phase in specimens formed by adding aqueous barium solutions to titanium alkoxide solutions was found to form as a single phase from appropriate compositions of the amorphous precipitates of the present invention at a temperature of about 700° to 1100° C. At higher temperatures up to about 1200° C., the $BaTi_5O_{11}$ phase was formed in mixtures of $BaTi_4O_9$ and, apparently, stoichiometric $BaTi_5O_{11}$ or $BaTi_5O_{11}$ plus rutile ($TiO_2$) (depending on the Ba/Ti ratio). Above this temperature, only the phase $Ba_2Ti_9O_{20}$ occurs in equilibrium with $BaTi_4O_9$ or rutile.

Hydrolysis of a precursor having a 2:9 barium to titanium ratio with an ethanol-water solution at the first stage was found to give a precursor disposed to form the $Ba_2Ti_9O_{20}$, $BaTi_5O_{11}$ and $BaTi_4O_9$ phases upon calcination. With prolonged calcination, the material was found to be completely converted to $Ba_2Ti_9O_{20}$. As opposed to the conventional high-temperature synthesis in which the 2:9 phase appears only above 1300° C., the present method allows production of the 2:9 phase at about 1100° C.

Hydrolysis of a precursor having a 1:5 barium to titanium ratio with an ethanol-water solution at the fourth stage was found to give a precursor disposed to form the $BaTi_5O_{11}$ phase upon calcination. Prior conventional high-temperature synthesis techniques in which the mixed oxides are calcined at temperatures in excess of 1300° C. are not capable of producing macroscopic amounts of this compound since it is unstable and does not form above 1300° C.

All calcination experiments conducted between 500° and 1000° C. were carried out in gold containers to avoid extraneous effects such as contamination from porcelain glazes or other oxide crucible materials; higher temperature experiments were necessarily conducted in platinum containers.

The present invention will be described in more detail with reference to the following examples. These examples are merely illustrative of the present method and are not intended to be limiting.

EXAMPLE 1

Approximately 1.0 g of BaO was refluxed in 35 ml of absolute ethanol for 2.0 hours in a dry argon atmosphere. The resultant slurry was cooled to room temperature and undissolved solids were separated by conventional filtration techniques in a dry argon atmosphere. The clear filtrate contained barium at a concentration of about 0.14M. Next, titanium isopropoxide was dissolved in absolute ethanol to produce a clear solution containing titanium at a concentration of about 0.63M.

The titanium solution was stirred and the barium solution was then added dropwise, under argon, to the stirring titanium solution.

EXAMPLE II

After stirring the barium and titanium mixture produced according to Example 1 for about 45 minutes at 25° C., a white precipitate developed.

EXAMPLE III

The precipitate produced according to Example II was dissolved by heating the system to 55° C. to give a clear solution.

EXAMPLE IV

The clear solution produced according to Example III was brought to reflux to about 80° C., in a dry argon atmosphere for about 18 hours. After refluxing the system, a precipitate developed.

EXAMPLE V

The barium and titanium system produced according to Example I was subjected to hydrolysis by adding an ethanol-water solution dropwise to the mixture. The ethanol-water solution contained water in a 10-20% excess over that required to hydrolyze all alkoxy groups attached to the barium and titanium atoms in the mixture. During hydrolysis a precipitate developed. The precipitate was separated by centrifugation, washed three times with small amounts of ethanol and was then dried in a vacuum oven at 120° C. for 2 to 6 hours.

EXAMPLE VI

The barium and titanium system produced according to Example II was subjected to hydrolysis by adding an ethanol-water solution dropwise to the mixture. The ethanol-water solution contained water in a 10-20% excess over that required to hydrolyze all alkoxy group attached to the barium and titanium atoms in the mixture. During hydrolysis, the resulting precipitate was separated by centrifugation, washed three times with small amounts of ethanol and was then dried in a vacuum oven at 120° C. for 2 to 6 hours. EXAMPLE VII The barium and titanium system produced according to Example IV was subjected to hydrolysis by adding an ethanol-water solution dropwise to the mixture. The ethanol-water solution contained water in a 10-20% excess over that required to hydrolyze all alkoxy groups attached to the barium and titanium atoms in the mixture. During hydrolysis, the resulting precipitate was separated by centrifugation, washed three times with small amounts of ethanol and was then dried in a vacuum oven at 120° C. for 2 to 6 hours.

EXAMPLE VIII

The barium and titanium system produced according to Example I was subjected to hydrolysis by adding an ethanol-water/ammonium hydroxide solution dropwise to the mixture. The ethanol-water/ammonium hydroxide solution contained water in a 10-20% excess over that required to hydrolyze all alkoxy groups attached to the barium and titanium atoms in the mixture. During hydrolysis a precipitate developed. The precipitate was separated by centrifugation, washed three times with small amounts of ethanol and was then dried in a vacuum oven at 120° C. for 2 to 6 hours.

EXAMPLE IX

The barium and titanium system produced according to Example II was subjected to hydrolysis by adding an ethanol-water/ammonium hydroxide solution dropwise to the mixture. The ethanol-water/ammonium hydroxide solution contained water in a 10-20% excess over that required to hydrolyze all alkoxy groups attached to the barium and titanium atoms in the mixture. During hydrolysis, the resulting precipitate was separated by centrifugation, washed three times with small amounts of ethanol and was then dried in a vacuum oven at 120° C. for 2 to 6 hours.

EXAMPLE X

The precipitates produced according to Examples V-IX were characterized by x-ray diffraction techniques and except for those in compositional proximity to the 1:1 Ba/Ti ratio, were all found to be amorphous at room temperature as were samples of each precipitate heated for about 16 hours at 500° C.

EXAMPLES XI

The precipitate produced according to Example V was heated at 1100° C. for 18 hours to determine the phase equilibria distribution in the precipitate. After heating, the material was characterized by x-ray diffraction techniques. The material was found to be composed of the $Ba_2Ti_9O_{20}$, $BaTi_5O_{11}$ and $BaTi_4O_9$ phases.

The material was then heated at 1100° C. for about 2 weeks and the material was again characterized by x-ray diffraction techniques. The material was now found to be completely converted to the $Ba_2Ti_9O_{20}$ phase.

EXAMPLE XII

The precipitate produced according to Example VI was heated at 1100° C. for 18 hours to determine the phase equilibria distribution in the precipitate. After heating, the material was characterized by x-ray diffraction techniques. The material was found to be composed of the $BaTi_5O_{11}$ and $BaTi_4O_9$ phases.

EXAMPLE XIII

The precipitate produced according to Example VII was heated at 1100° C. for 18 hours to determine the phase equilibria distribution in the precipitate. After heating, the material was characterized by x-ray diffraction techniques. The material was found to be composed of the $BaTi_5O_{11}$ and $BaTi_4O_9$ phases.

Upon further heating the material at 1300° C., the $Ba_2Ti_9O_{20}$ phase was found to form slowly.

EXAMPLE XIV

The precipitate produced according to Example VIII was heated at 1100° C. for 18 hours to determine the phase equilibria distribution in the precipitate. After heating, the material was characterized by x-ray diffraction techniques. The material was found to be composed of the $Ba_2Ti_9O_{20}$, $BaTi_5O_{11}$ and $BaTi_4O_9$ phases.

EXAMPLE XV

The precipitate produced according to Example IX was heated at 1100° C. for 18 hours to determine the phase equilibria distribution of phases in the precipitate. After heating, the material was characterized by x-ray diffraction techniques. The material was found to be composed of the $Ba_2Ti_9O_{20}$, $BaTi_5O_{11}$ and $BaTi_4O_9$ phases.

EXAMPLE XVI

Approximately 1.0 g of BaO was refluxed in 35 ml of absolute ethanol for 2.0 hours in a dry argon atmosphere. The resultant slurry was cooled to room temperature and undissolved solids were separated by conventional filtration techniques in a dry argon atmosphere. The clear filtrate contained barium at a concentration of about 0.14M. Next, titanium isopropoxide was dissolved in absolute ethanol to produce a clear solution containing titanium at a concentration of about 0.70M.

The titanium solution was stirred and the barium solution was then added dropwise, under argon, to the stirring titanium solution. After stirring the barium and titanium mixture for about 45 minutes at 25° C., a white precipitate developed.

The precipitate was dissolved by heating the system to 55° C. to give a clear solution. The clear solution was then brought to reflux at about 80° C., in a dry argon atmosphere for about 18 hours. After refluxing the system a precipitate developed.

The barium and titanium system was then subjected to hydrolysis by adding an ethanol-water solution dropwise to the mixture. The ethanol-water solution contained water in a 10–20% excess over that required to hydrolyze all alkoxy groups attached to the barium and titanium atoms in the mixture. During hydrolysis a white precipitate developed. The system was then refluxed at about 80° C. for an additional 3 hours. After refluxing, the system was cooled to room temperature. The precipitate was separated by centrifugation, washed three times with small amounts of ethanol and was then dried in a vacuum oven at 120° C. for 2 to 6 hours.

EXAMPLE XVII

The precipitate produced according to Example XVI was characterized by x-ray diffraction techniques and was found to be amorphous at room temperature as was a sample of the precipitate heated for about 16 hours at 500° C.

EXAMPLE XVIII

The precipitate produced according to Example XVI was heated at 1100° C. for 18 hours to determine the phase equilibria distribution in the precipitate. After heating, the material was characterized by x-ray diffraction techniques. The material was found to be composed of a crystalline single phase of $BaTi_5O_{11}$.

Thus, the present process permits synthesis of high purity, submicron crystalline powders containing any desired ratio of Ba/Ti. Also, deliberate dopants, such as Sr, Zr, Nb, Bi, Pb and alkaline-earth or rare-earth ions, can be introduced and homogeneously dispersed at the molecular level. Most importantly, the present process yields crystalline barium titanates that cannot be synthesized in macroscopic amounts by any other known means. These crystalline barium titanates open future experimental research and commercial opportunities for processing completely new classes of ceramic dielectrics having dielectric properties with very little or no temperature dependency that can operate at a much wider temperature range than prior ceramic dielectrics.

Finally, the present process, with modification, is applicable to a wider range of dielectric and piezoelectric ceramics, such as those based on $ZrTiO_4$ and PZT (i.e., $Pb(Zr,Ti)O_3$).

While the present invention has been described in detail and with reference to specific examples thereof, it will be apparent to one skilled in the art that various changes and modifications can be made without departing from the spirit and scope thereof.

What is claimed is:

1. A process for synthesizing single phase crystalline $Ba_2Ti_9O_{20}$ powders comprising the steps of:
   (a) dissolving barium oxide in a first lower alkyl alcohol in a dry atmosphere to form a barium alkoxide solution;
   (b) dissolving a titanium alkoxide in a second lower alkyl alcohol in a dry atmosphere to form a titanium alkoxide solution;
   (c) combining said barium alkoxide solution and said titanium alkoxide solution in a dry atmosphere to form a mixed barium-titanium alkoxide system wherein the molar ratio of barium to titanium in said mixed system is approximately 2:9;
   (d) subjecting said mixed barium-titanium alkoxide system to hydrolysis at a reflux temperature of between 70° C. and 90° C. to form a precipitate;
   (e) separating said precipitate and drying said precipitate; and
   (f) heating said precipitate at a temperature of between 700° C. and 1100° C. for approximately between 15–20 hours to form a crystalline, single phase of $Ba_2Ti_9O_{20}$.

2. The process of claim 1, wherein said mixed barium-titanium alkoxide system is subjected to hydrolysis by adding an ethanol-water solution to said system.

3. The process of claim 2, wherein said ethanol-water solution contains water in a 10 to 20% excess over that required to hydrolyze all alkoxy groups of said mixed barium-titanium alkoxide solution.

4. The process of claim 1, wherein said titanium alkoxide is titanium isopropoxide.

5. The process of claim 1, wherein said first lower alkyl alcohol and said second lower alkyl alcohol have from 1 to 3 carbon atoms.

6. The process of claim 1, wherein said first lower alkyl alcohol and said second lower alkyl alcohol are ethanol.

7. A process for synthesizing single phase crystalline $Ba_2Ti_9O_{20}$ powders comprising the steps of:
   (a) dissolving barium oxide in a first lower alkyl alcohol in a dry atmosphere to form a barium alkoxide solution;
   (b) dissolving a titanium alkoxide in a second lower alkyl alcohol in a dry atmosphere to form a titanium alkoxide solution;
   (c) combining said barium alkoxide solution and said titanium alkoxide solution to form a mixed barium-titanium alkoxide system wherein the molar ratio of barium to titanium in said mixed system is approximately 2:9;
   (d) stirring said mixed barium-titanium alkoxide system to form a precipitate;
   (e) subjecting said mixed barium-titanium alkoxide system containing said precipitate to hydrolysis at a reflux temperature of between 70° C. and 90° C.;
   (f) separating said precipitate and drying said precipitate; and
   (g) heating said precipitate at a temperature of between 700° C. and 1100° C. for between 15 and 20 hours to form a crystalline, single phase of $Ba_2Ti_9O_{20}$.

8. The process of claim 7, wherein said mixed barium-titanium alkoxide system containing said precipitate is subjected to hydrolysis by adding an ethanol-water solution to said system.

9. The process of claim 8, wherein said ethanol-water solution contains water in a 10 to 20% excess over that required to hydrolyze all alkoxy groups of said mixed barium-titanium alkoxide solution.

10. The process of claim 7, wherein said titanium alkoxide is titanium isopropoxide.

11. The process of claim 7, wherein said first lower alkyl alcohol and said second lower alkyl alcohol have from 1 to 3 carbon atoms.

12. The process of claim 7, wherein said first lower alkyl alcohol and second lower alkyl alcohol are ethanol.

13. A process for synthesizing single phase crystalline $BaTi_5O_{11}$ powders comprising the steps of:
   (a) dissolving barium oxide in a first lower alkyl alcohol to form a barium alkoxide solution;
   (b) dissolving a titanium alkoxide in a second lower alkyl alcohol to form a titanium alkoxide solution;
   (c) combining said barium alkoxide solution and said titanium alkoxide solution to form a mixed barium-titanium alkoxide system wherein the molar ratio of barium to titanium in said mixed system is approximately one to five;
   (d) stirring said mixed barium-titanium alkoxide system to form a first precipitate;
   (e) heating said mixed barium-titanium alkoxide system containing said first precipitate at a reflux temperature of between 70° C. and 90° C. for between 15-20 hours to dissolve said first precipitate and form a second precipitate;
   (f) subjecting said mixed barium-titanium alkoxide system containing said second precipitate to hydrolysis to form a precursor;
   (g) separating and drying said second precipitate; and
   (h) calcining said precipitate at between 700° C. and 1100° C. for a period of between 15 and 20 hours to form a crystalline, single phase of $BaTi_5O_{11}$.

14. The process of claim 13, wherein said mixed barium-titanium alkoxide system containing said second precipitate is subjected to hydrolysis by adding an ethanol-water solution to said system.

15. The process of claim 13, wherein said ethanol-water solution contains water in a 10 to 20% excess over that required to hydrolyze all alkoxy groups of said mixed barium-titanium alkoxide solution.

16. The process of claim 13, wherein said titanium alkoxide is titanium isopropoxide.

17. The process of claim 13, wherein said first lower alkyl alcohol and said second lower alkyl alcohol have from 1 to 3 carbon atoms.

18. The process of claim 13, wherein said first lower alkyl alcohol and said second lower alkyl alcohol are ethanol.

* * * * *